United States Patent [19]

Teramachi

[11] Patent Number: 4,604,911
[45] Date of Patent: Aug. 12, 1986

[54] RECIRCULATING-BALL ROTARY-TO-LINEAR CONVERTER WITH AN IMPROVED BALL RETURN GUIDE

[76] Inventor: Hiroshi Teramachi, 2-34-8, Higashi-Tamagawa, Setagaya-ku, Tokyo, Japan

[21] Appl. No.: 801,394

[22] Filed: Nov. 25, 1985

Related U.S. Application Data

[63] Continuation of Ser. No. 465,645, Feb. 10, 1983.

[30] Foreign Application Priority Data

Feb. 26, 1982 [JP] Japan .................................. 57-28751

[51] Int. Cl.$^4$ ..................... F16H 27/02; F16H 1/18; F16H 1/20
[52] U.S. Cl. .................................. 74/424.8 R; 74/459; 74/89.15
[58] Field of Search ........ 74/424.8 R, 89.15, 424.8 A, 74/457, 458, 459

[56] References Cited

U.S. PATENT DOCUMENTS

| | | | |
|---|---|---|---|
| 2,444,886 | 7/1948 | Vickers | 74/424.8 R X |
| 2,488,917 | 11/1949 | Kennedy et al. | 74/499 |
| 2,870,650 | 1/1959 | Stump et al. | 74/89.15 |
| 3,046,808 | 7/1962 | Demart | 74/216.3 X |
| 3,113,469 | 12/1963 | Müller | 74/499 |
| 3,485,110 | 12/1969 | Beck | 74/424.8 R |
| 3,762,227 | 10/1973 | Bohnhoff | 74/89.15 |
| 4,177,690 | 12/1979 | Klinkenberg | 74/424.8 R |
| 4,221,137 | 9/1980 | Futaba | 74/499 X |

FOREIGN PATENT DOCUMENTS

| | | | |
|---|---|---|---|
| 45453 | 4/1979 | Japan | 74/216.3 |
| 850639 | 10/1960 | United Kingdom | 74/424.8 R |
| 875506 | 8/1961 | United Kingdom | 74/499 |
| 2001729 | 2/1979 | United Kingdom | 74/499 |
| 247742 | 11/1969 | U.S.S.R. | 74/424.8 R |
| 277483 | 10/1970 | U.S.S.R. | 74/424.8 R |

OTHER PUBLICATIONS

Russell C. Ball Jr., Product Engineering, 4/2/62, vol. 33, No. 7, p. 71.

Primary Examiner—Kenneth J. Dorner
Assistant Examiner—Mike Bednarek
Attorney, Agent, or Firm—Armstrong, Nikaido, Marmelstein & Kubovcik

[57] ABSTRACT

A device comprising a worm and a ball nut, with antifriction balls rollably engaged between their opposed screw threads to convert the rotation of either into the endwise motion of the other. Employed for the recirculation of the balls is a tubular guide providing a ball return path from one end of the ball nut to the other. The ball return guide is arcuate in shape and is mounted on the outside of the ball nut with its opposite end portions inserted in openings drilled in the ball nut in axially and circumferentially spaced positions thereon. The arcuate ball return guide is easier of manufacture, and enables the balls to travel more smoothly therethrough, than the conventional U-shaped one.

1 Claim, 5 Drawing Figures

RECIRCULATING-BALL ROTARY-TO-LINEAR CONVERTER WITH AN IMPROVED BALL RETURN GUIDE

This application is a continuation of application Ser. No. 465,645 filed 2/10/83.

BACKGROUND OF THE INVENTION

This invention relates to devices for converting bidirectional rotation into rectilinear reciprocation, and more specifically to such a rotary-to-linear converter of the type having a worm and a ball nut, with recirculating antifriction balls rollably engaged between their opposed screw threads to translate the rotation of either into the rectilinear travel of the other. Still more specifically the invention deals with improvements in or relating to a tubular ball return guide in such a rotary-to-linear converter.

Rotary-to-linear converters of the worm-and-ball-nut design, known also as the recirculating-ball type, convert sliding friction into rolling friction by virtue of the antifriction balls. Because of the minimal friction resistance between the major mating parts the devices have found widespread use in feed mechanisms of machine tools or the like, among other applications.

An objection to this type of rotary-to-linear converter concerns the ball return guide for carrying the antifriction balls from one end of the ball nut to the other. The ball return guide takes the form of a tube, having an inside diameter slightly more than the ball diameter, which has conventionally been bent into the shape of a U. The two parallel limbs of the U-shaped ball return guide are inserted in holes in the ball nut to such an extent that their ends come flush with the helical groove inside the ball nut. These tube ends are specially cut to allow smooth transfer of the balls from the ball nut groove into the ball return guide and back into the ball nut groove. Thus the balls constantly recirculate during the relative rotation and axial movement of the worm and the ball nut.

Being U-shaped, however, the conventional ball return guide has two sharply curved, or nearly bent, portions for right-angularly joining its two parallel limbs to another limb bridging them. The sharply curved or bent parts of the ball return guide tend to retard the flow of the antifriction balls therethrough and to give rise to noise, especially when the speed of the relative motion between the worm and the ball nut is high. The known ball return guide has thus imposed a limit on the operating speed of the rotary-to-linear converter. Whatever the operating speed, moreover, the smooth recirculation of the balls is a prerequisite for the efficient, frictionless relative rotation and endwise motion of the worm and the ball nut.

Another drawback of the known U-shaped ball return guide is the difficulty of its manufacture. It does not lend itself to easy mass production.

A problem has also existed in connection with the holes in the ball nut for the insertion of the opposite ends of the ball return guide. Created by end milling, the holes are bell-shaped, with flaring outer ends. Not every part of the bell-shaped holes is necessary for the insertion of the ball return guide. The unnecessary parts of the holes serve only to reduce the strength of the ball nut.

SUMMARY OF THE INVENTION

The present invention seeks to make smoother the travel of the antifriction balls through the tubular ball return guide in a rotary-to-linear converter of the type defined.

The invention also seeks to improve the holes or openings formed in the ball nut for receiving the opposite end portions of the ball return guide so that no part of the ball nut may be removed other than is necessary for the insertion of the ball return guide.

According to the invention, stated in brief, there is provided a rotary-to-linear converter of the type having a worm and a ball nut, with antifriction balls interposed therebetween for rolling motion along the external and internal screw threads cut therein. The invention particularly features a tubular ball return guide providing a return path for the antifriction balls from one end of the ball nut to the other. Arcuate in shape, the ball return guide is immovably mounted on the outside of the ball nut with its opposite end portions inserted in a pair of openings formed through the ball nut in both axially and circumferentially spaced positions thereon.

By the term "arcuate", as used herein and in the claims appended hereto to describe the shape of the improved ball return guide of this invention, are meant approximately semicircular, semielliptic, or similar shapes having no sharp curves or bends. Such an arcuate ball return guide offers little frictional resistance to the balls traveling therethrough. Accordingly, regardless of the speed, the rotation of either the worm or the ball nut can be efficiently translated via the smoothly recirculating balls into the rectilinear movement of the other. Noise production by the balls moving through the return guide is also drastically reduced.

It will also be appreciated that the arcuate ball return guide is easier to manufacture, and requires less material, than the conventional U-shaped one, thus contributing to the cost reduction of the rotary-to-linear converter. Higher rigidity is an additional advantage of the arcuate ball return guide.

The invention also features the pair of openings in the ball nut for the insertion of the opposite end portions of the arcuate ball return guide. Each opening is composed essentially of a first portion of semicircular cross section extending straightly in a tangential direction of the cylinder bounded within the ball nut, and a second portion of semicircular cross section curving away from the first portion as it extends outwardly of the ball nut.

The ball nut openings of the above defined shape are well calculated to allow easy insertion of the end portions of the arcuate ball return guide. Unlike the conventional bell-shaped holes the openings are fully utilized for the insertion of the guide end portions. Thus, since no unnecessary part of the ball nut is cut away, the ball nut has greater strength and rigidity than heretofore and so serves to extend the useful life of the rotary-to-linear converter.

It is also an advantage of the ball nut openings of the above shape that they can be easily formed by a usual round-nosed drill, instead of by end milling, only with the drilling direction changed as required. The ease of drilling the openings in the ball nut helps to reduce the manufacturing cost of the rotary-to-linear converter.

The above and other features and advantages of this invention will become more apparent, and the invention itself will best be understood, from a study of the following description of a preferred embodiment shown in the attached drawings.

DESCRIPTION OF THE PREFERRED EMBODIMENT

Figure 1:
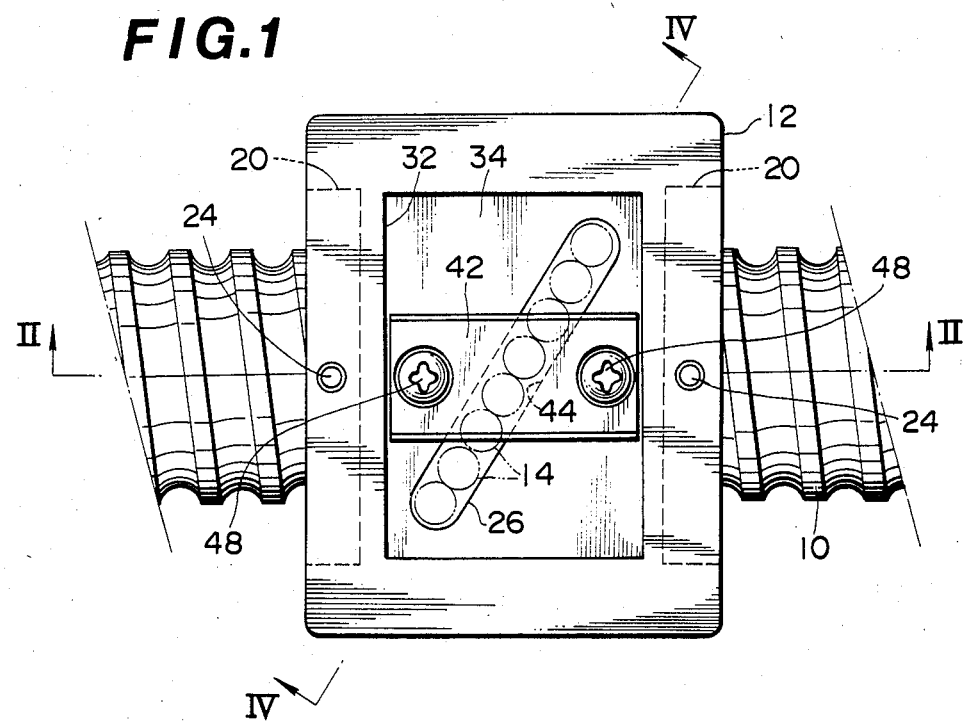
FIG. 1 is an elevation of the rotary-to-linear converter incorporating the novel concepts of this invention.
Figure 2:
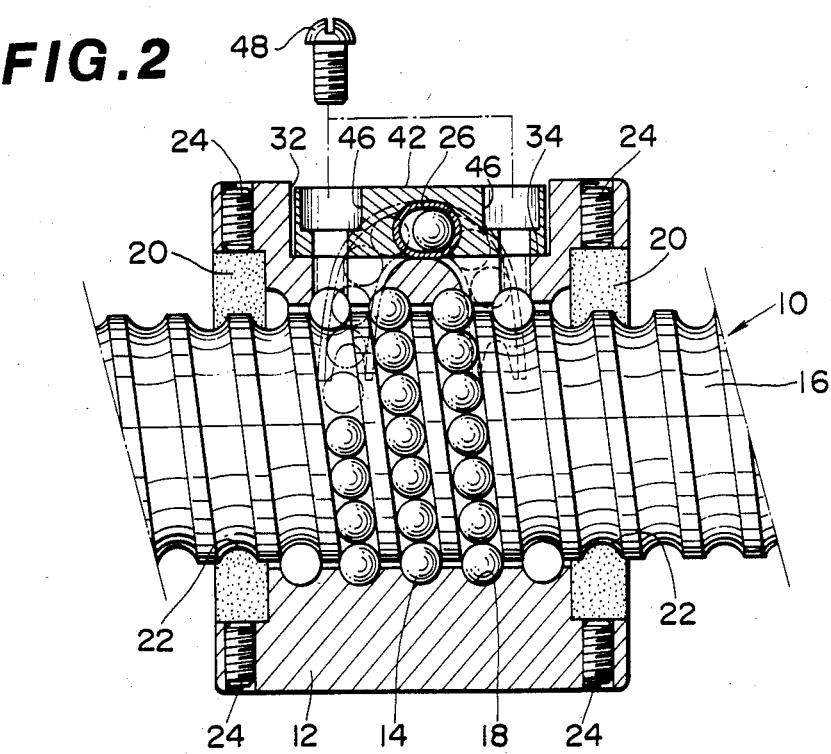
FIG. 2 is an axial section through the rotary-to-linear converter, taken along the line II—II of FIG. 1.

The general organization of the rotary-to-linear converter in accordance with the invention will become apparent upon consideration of FIGS. 1 and 2. It comprises a worm 10 and a ball nut 12. Either the worm or the ball nut is to be revolved by external means to cause endwise movement of the other. The ball nut 12 is mounted on the worm 10 via a plurality or multiplicity of antifriction balls 14. These balls are rollably engaged in an external helical groove 16 cut in the worm 10 and in an internal helical groove 18 cut in the ball nut 12.

Thus, upon rotation of the worm 10, for example, the balls 14 roll in the helical groove 16 in the worm. The balls must also roll in the helical groove 18 in the ball nut 12. Consequently, as the worm 10 rotates, the balls 14 cause the ball nut 12 to move linearly along the worm. For the same reason the rotation of the ball nut 12 results in the axial movement of the worm 10.

A pair of sealing rings 20 are fitted in the opposite ends of the ball nut 12. Preferably molded from a rigid plastic or hard rubber having a wear-resisting property, the sealing rings 20 are internally screw threaded at 22 to slidably mate with the helical groove 16 in the worm 10. These rings seal the ends of the ball nut 12 against the intrusion of dust and other foreign matter into the ball nut 12. Also, by relatively sliding over the worm 10, the sealing rings function to prevent dust accumulation on the worm. Seen at 24 are set screws for firmly retaining the sealing rings 20 in position on the ball nut 12.

As the ball nut 12 travels endwise relative to the worm 10 in either direction, the balls 14 must recirculate along the internal helical groove 18 in the ball nut. Provided to this end is a ball return guide 26 providing a return path for the balls 14 from either end of the ball nut 12 to the other.

Figure 3:
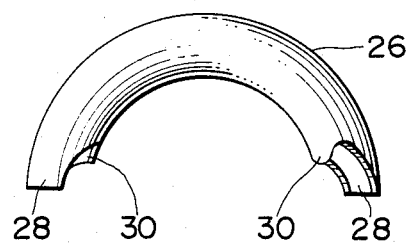
FIG. 3 is an elevation of the tubular ball return guide in the rotary-to-linear converter of FIGS. 1 and 2.

As better shown in FIG. 3, the ball return guide 26 is a relatively short length of tube with an inside diameter slightly more than the diameter of the balls 14. The invention proposes the arcuate curving of the tube, instead of bending it into the shape of a U as in the prior art. In this particular embodiment the tubular ball return guide is curved with a constant radius into a semicircular shape. The radius of curvature is of course subject to change depending upon the inside diameter of the ball nut 12. The tube of which the ball return guide is made may be of any metal, either ferrous or nonferrous, that is sufficiently wear-resistant and suitably strong. The opposite open ends of the ball return guide are cut so that their outer sides 28 are longer than the inner sides 30. This cutting of the ends is intended for the smooth entrance and exit of the balls 14 into and out of the return guide 26 from and back into the opposed helical grooves 16 and 18 in the worm 10 and ball nut 12.

Figure 4:
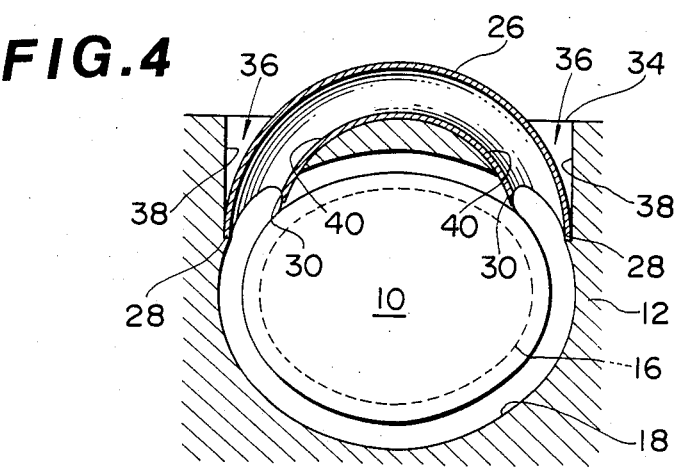
FIG. 4 is a section taken along the line IV—IV of FIG. 1 and showing only the ball nut and the ball return guide in their relative working positions.
Figure 5:
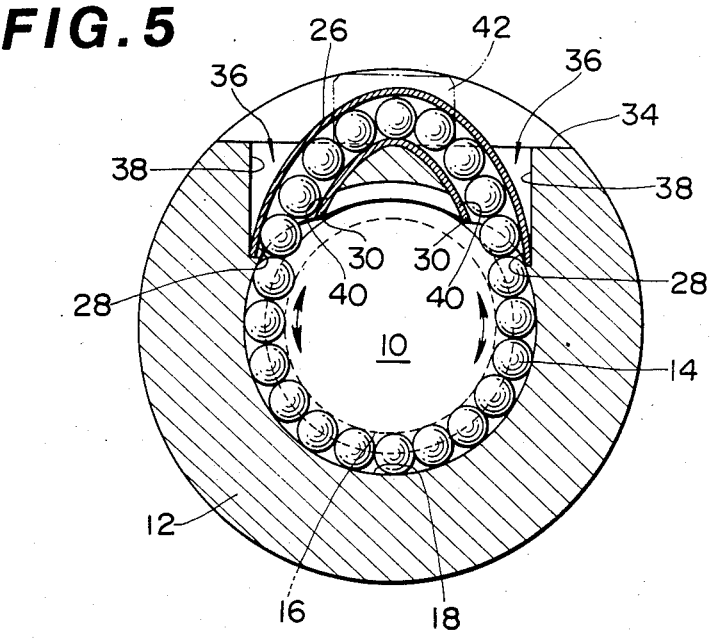
FIG. 5 is a schematic sectional view explanatory of the recirculation of the antifriction balls in the rotary-to-linear converter of FIGS. 1 and 2.

In FIGS. 4 and 5 is shown the ball return guide 26 mounted in position on the ball nut 12. As will be seen also from FIGS. 1 and 2, a rectangular recess 32 is formed in the outside of the ball nut 12 to provide a flat surface 34. The ball return guide 26 is placed diagonally on this flat 34, with its opposite end portions inserted in a pair of openings 36 formed through the ball nut 12. It will be seen, then, that the openings 36 lie in both axially and circumferentially spaced positions on the ball nut 12.

Each opening 36 is composed essentially of a first portion 38 of semicircular cross section extending straightly in a tangential direction of the cylinder defined within the ball nut 12, and a second portion 40 of semicircular cross section located on that side of the first portion which is directed toward the other opening 36 and curving away from the first portion as it extends outwardly of the ball nut. These openings 36 can be formed by means of a round-nosed drill, as on a numerically controlled machine tool.

It will be understood from FIGS. 4 and 5 that the opposite end portions of the arcuate ball return guide 26 can be readily inserted in the respective openings 36 in the ball nut 12 simply as the guide is placed on the flat 34 of the ball nut. Thus mounted in position, the ball return guide 26 has its opposite ends open to the endmost turns of the internal helical groove 18 in the ball nut 12, as best pictured in FIG. 2, thereby providing a ball return path in either direction therebetween.

With reference back to FIGS. 1 and 2 a clamp 42 is attached to the flat 34 of the ball nut 12 for firmly retaining the ball return guide 26 in place thereon. The ball return guide clamp 42 is a generally rectangular piece of metal having a channel-shaped groove 44 cut diagonally in its bottom surface to closely receive part of the ball return guide 26. A pair of counterbored mounting holes 46 are formed through the ball return guide clamp 42 for the passage of screws 48 by which the clamp is fastened to the ball nut 12.

In the operation of the rotary-to-linear converter constructed as in the foregoing, the antifriction balls 12 roll as aforesaid in the helical groove 16 in the worm 10 and in the helical groove 18 in the ball nut 12 with rotation of either of the worm and the ball nut to cause axial movement of the other. Each ball 14 makes several turns around the worm 10. Then, reaching one of the opposite endmost turns of the helical groove 18 in the ball nut 12, the balls successively enter the tubular ball return guide 26 through one of its contoured ends. The balls can travel smoothly and noiselessly through the return guide by virtue of its arcuate shape. Then the balls emerge from the other end of the return guide to the other of the endmost turns of the helical groove in the ball nut, again becoming caught between the worm and the ball nut.

The balls 14 constantly recirculate along the above closed path as long as either of the worm and the ball nut rotates to cause axial movement of the other. The traveling direction of the balls along the path is of course subject to change depending upon the directions of the relative rotation and axial movement of the worm and the ball nut.

While the preferred embodiment of the invention herein disclosed is well calculated to fulfill the objectives above stated, it will be understood that the invention is susceptible to modification, variation and change without departing from the proper scope or fair meaning of the following claims.

What is claimed is:

1. In a rotary-to-linear converter for translating rotary motion into rectilinear motion, comprising a ball nut mounted on a worm via a plurality of antifriction balls rollably engaged between an internal helical groove in the ball nut and an external helical groove in the worm, a tubular ball return guide providing a return path for the balls from one end of the ball nut to the other and having an arcuate shape with a constant radius, the opposite end portions of the ball return guide being received in a pair of openings formed through the ball nut in axially and circumferentially spaced positions thereof, each opening in the ball nut composed essentially of a first portion of semicircular cross section extending straightly in a tangential direction from a cylinder bounded within the ball nut; a second portion of semicircular cross section curving away from the first portion as it extends outwardly from the ball nut the improvement wherein the ball nut has rectangular recess formed in the outside of the ball nut so as to provide a flat surface; a clamp is attached to the flat surface of the ball nut for fimly retaining the ball return guide in place thereon; and the ball guide clamp has a channel-shaped groove cut diagonally in its bottom surface, into which groove is closely fitted that part of the ball return guide which projects outwardly of the ball nut.

* * * * *